UNITED STATES PATENT OFFICE.

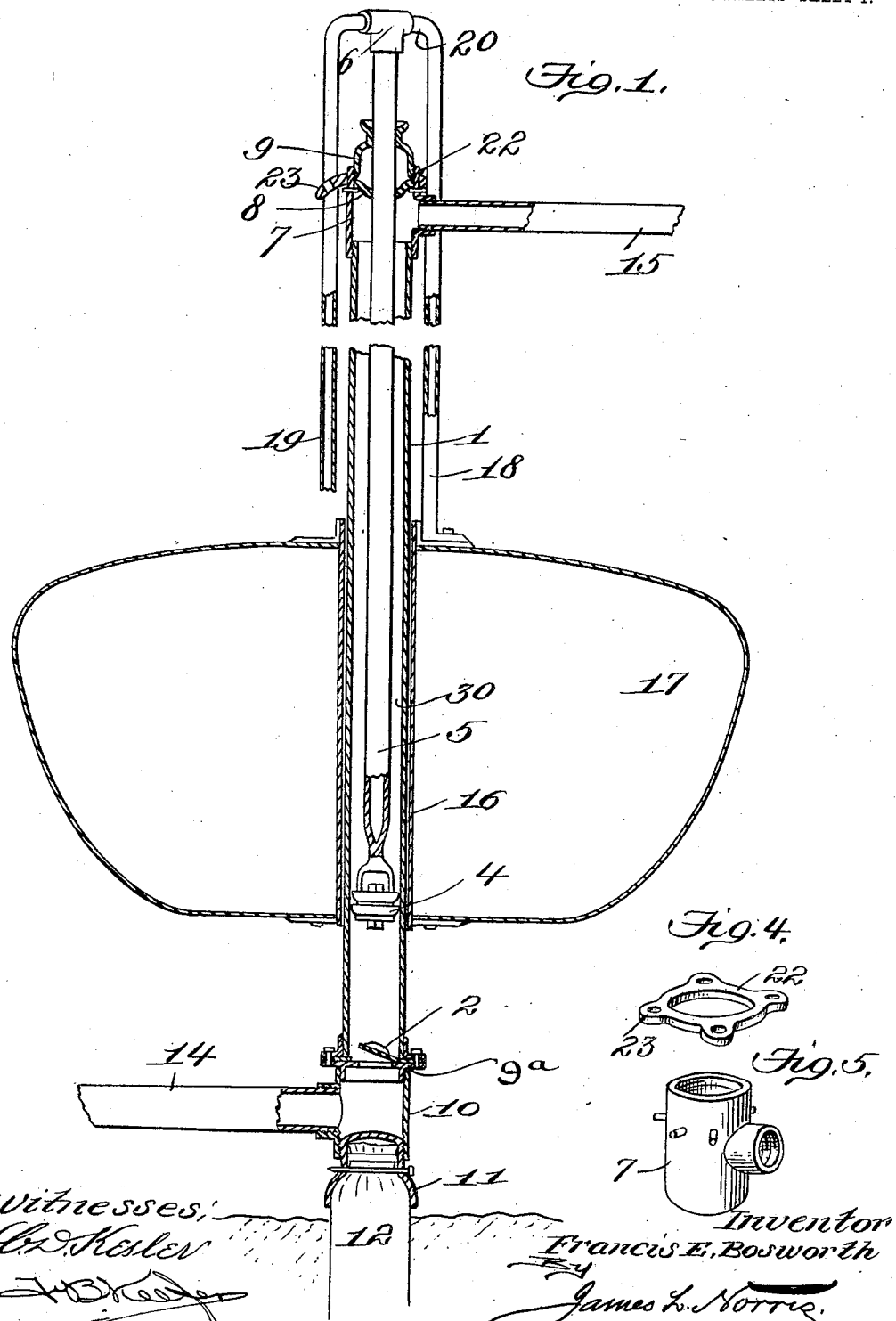

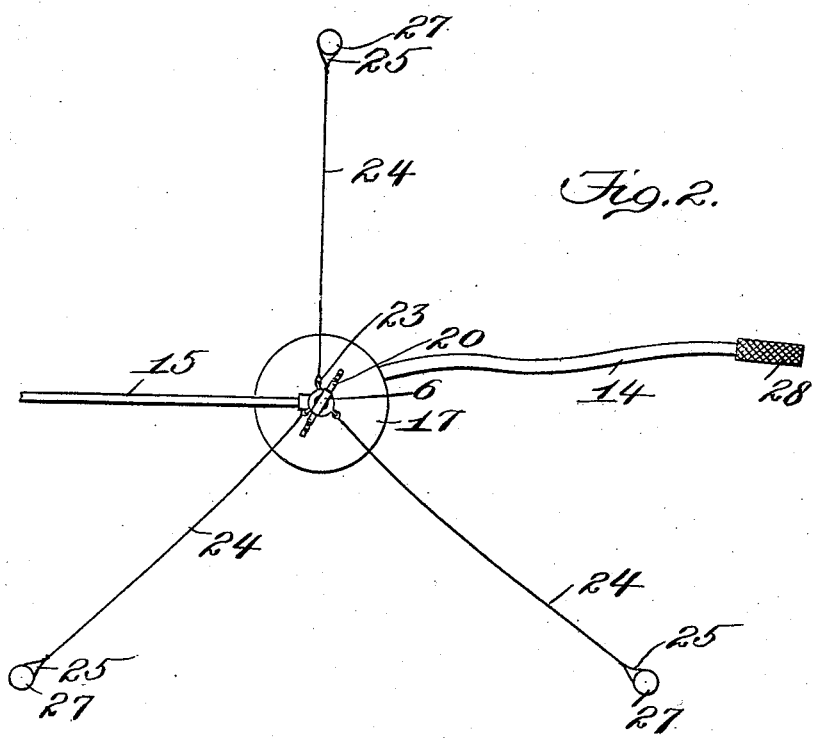
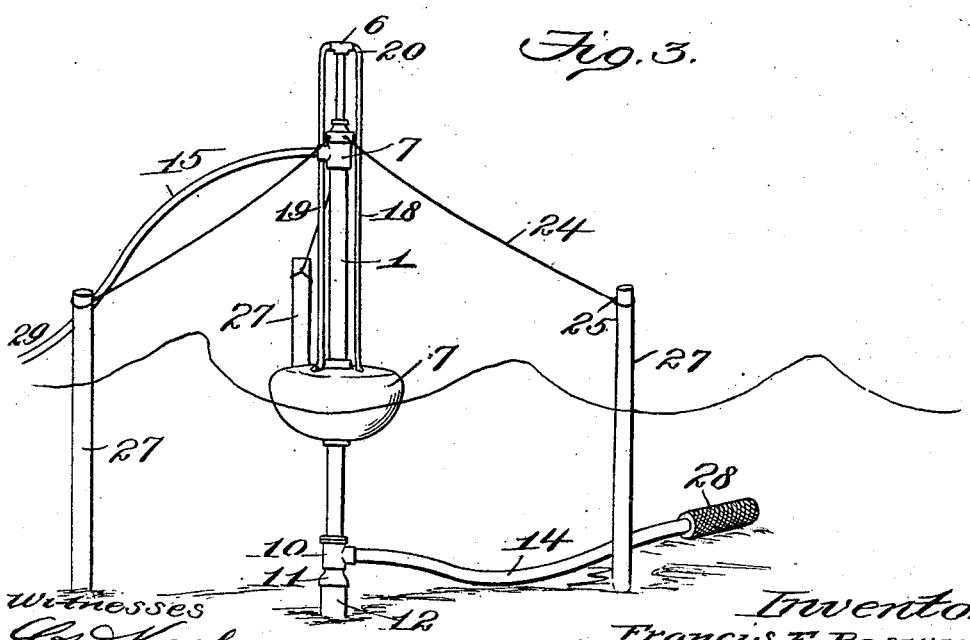

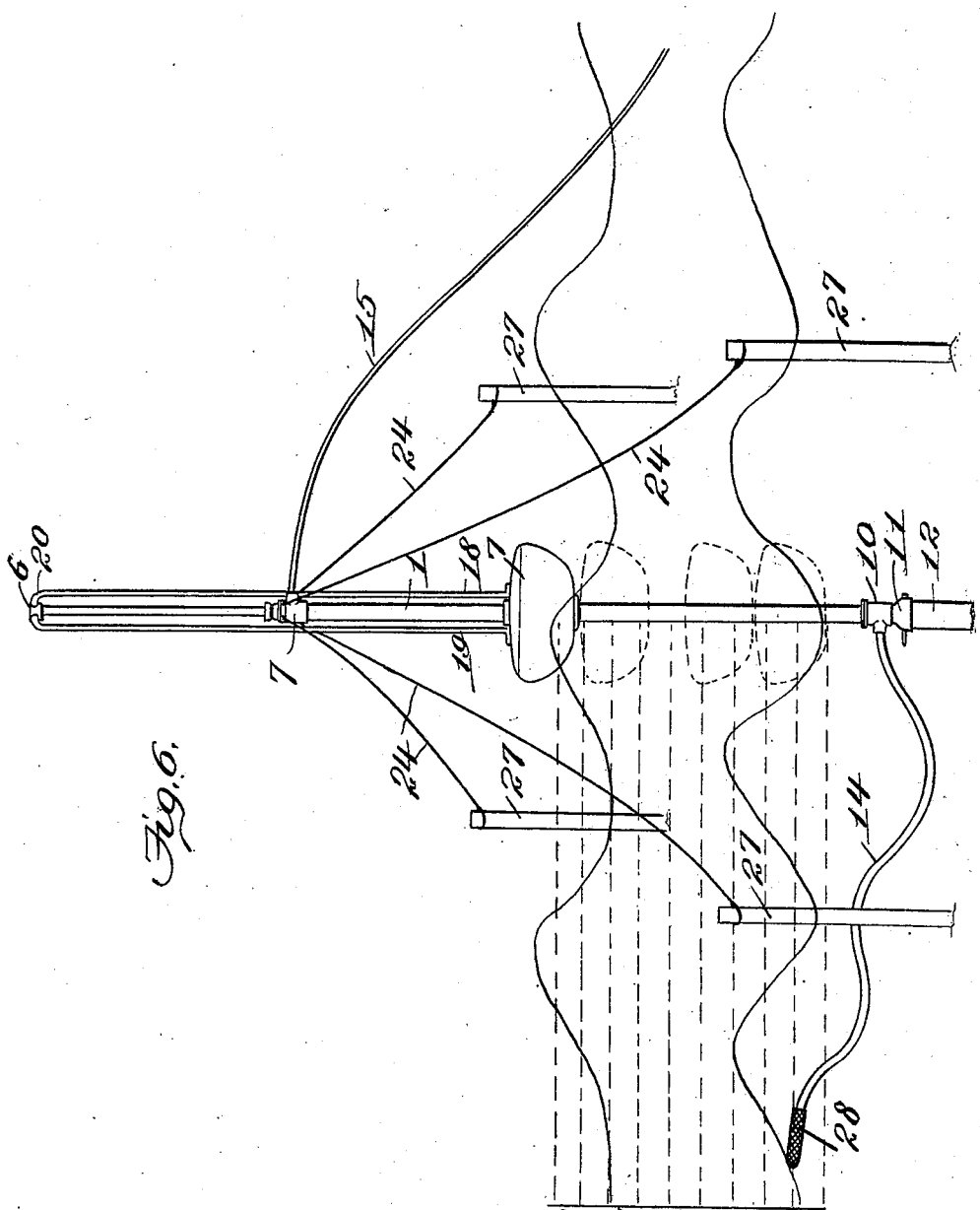

FRANCIS E. BOSWORTH, OF SAN FRANCISCO, CALIFORNIA.

WAVE-POWER PUMPING APPARATUS.

No. 886,931.  Specification of Letters Patent.  Patented May 5, 1908.

Application filed March 11, 1907. Serial No. 361,722.

*To all whom it may concern:*

Be it known that I, FRANCIS E. BOSWORTH, a citizen of the United States, residing at San Francisco, in the county of San Francisco and State of California, have invented new and useful Improvements in Wave-Power Pumping Apparatus, of which the following is a specification.

This invention relates to a wave power pumping apparatus and the object thereof is to provide means in a manner as hereinafter set forth which will automatically adjust itself to all the irregular changes of the reciprocating motion of the waves so as to make the irregular changing reciprocating motion of the ocean useful as a motive power for pumping water, oil, or other fluid.

A further object of the invention is to provide a wave power pumping apparatus which shall be simple in its construction, strong, durable, efficient in its use, automatically adapting itself to all irregular changing requirements in its operation, readily set up, and comparatively inexpensive to manufacture.

With the foregoing and other objects in view the invention consists of the novel construction, combination, and arrangements of parts hereinafter more specifically described and illustrated in the accompanying drawings, wherein is shown the preferred embodiment of the invention, but it is to be understood that changes, variations, and modifications can be resorted to which come within the scope of the claims hereunto appended.

In describing the invention in detail, reference is had to the accompanying drawings, wherein like reference characters denote corresponding parts throughout the several views, and in which Figure 1 is a vertical sectional view of a wave power pumping apparatus in accordance with this invention. Fig. 2 is a top plan. Fig. 3 is a side elevation. Figs. 4 and 5 are details. Fig. 6 is a diagrammatical view showing the operation of the apparatus.

Referring to the drawings by reference characters, 1 denotes an elongated pump cylinder having its lower end provided with an inlet valve 2 of known construction. Arranged within the pump cylinder 1 is a piston valve 4 of known construction, and to which is connected an elongated piston rod 5 which extends through and above the upper end of the cylinder 1 and carries on its outer end a T-shaped pipe coupling 6. To the upper end of the pump cylinder 1 is secured a T-shaped coupling 7. Into the top end of this coupling is secured a packing nut and washer 8 forming a packing box 9 to close the upper end of the pump chamber around the piston rod 5, and to the lower end of the pump cylinder 1 is secured a flange to which is bolted a flanged valve seat $9^a$, the lower flange of which enters a T-shaped pipe coupling 10 at the top thereof. The bottom end of this coupling is closed with a hollow bell-shaped plug 11 adapted to securely fasten over a pile 12 or upon the mud or over a point of rocks or masonry that it may be made to fit for supporting and retaining the lower end of the whole pumping apparatus in position.

The suction pipe of the apparatus is indicated by the reference character 14 which is secured to the side opening of the T-coupling 10. The discharge pipe 15 is secured in the side opening of the T-coupling 7.

Surrounding the pump cylinder 1 is a vertically shifting tube 16 which forms the inner wall of an air-tight oval-shaped float 17. The latter is connected by a pair of vertically-extending rods 18, 19 to the T-coupling 6 carried on the upper end of the piston rod 5, and for such purpose the upper end of each of the rods 18 and 19 is bent inwardly at right-angles, as at 20, and said ends connect with T-coupling 6 by right and left threads. The lower ends of the rods 18 and 19 are bent outwardly at right-angles and are securely bolted to the heavy circular top plate of the float.

The necessary size and weight of the float will be determined by the floating buoyancy and weight required to cause the operation of the piston of a given sized pump cylinder, having a discharge at a given elevation, when motion is transmitted to the float by the waves.

Surrounding the top of the coupling 7 is a collar 22 provided with a plurality of loops 23 for the purpose of connecting guy ropes, cables, or other suitable bracing means 24 to the pump cylinder, and the braces 24 have their outer ends secured, as at 25, to anchoring devices 27 or other suitable supports.

The suction pipe 14 is elongated and provided at its free end with a screen to constitute a filter, as indicated by the reference character 28, which is adapted to prevent the entrance of foreign matter to the pipe, so that no interference will be had with the operation of the pump. The elongated discharge pipe may be curved near the pump cylinder so as not to interfere with the full action of the float, and then be brought down to or near the ground, as at 29, to serve as one support and brace.

The piston rod is of the same length as the cylinder and of such diameter with respect to the diameter of the cylinder as to displace one-half of the column of water or fluid in the pump chamber 30. One-half being thus displaced, the buoyancy of the float as it raises the piston valve has only to act against the other remaining half column of fluid. As the weight of the float causes the piston to again descend back into the pump cyinder, its weight has only to act against the one-half column that it again displaces, which enables the reducing of the buoyancy and weight to one-half, and as the contents of the chamber are always divided by the piston rod so the discharge will be divided one-half reducing the discharge pipe one-half, and furthermore obtains a continuous even discharge of fluid without jerk or jar. The large diameter of the piston rod also possesses the advantage of being able to support itself, and when the coupling rods are elevated above the loop band 22 at the top of the pump cylinder it will not be necessary to employ a heavy cross-head or cumbersome framework.

The length of the pump cylinder, piston and float-connection-rods is such as to provide for the ever-changing movement of tide and waves, enabling the float to freely utilize all the motive power, that is, the highest waves at high tide and the lowest waves at low tide, and such arrangement dispenses with the employment of an over-flow well or a floating pontoon boat, and many other unsuccessful devices.

What I claim is:

1. A wave power pumping apparatus comprising an elongated cylinder, a piston operating therein, a piston rod connected to the piston and projecting from the upper end of the cylinder, a float surrounding the cylinder, coupling rods secured at their lower ends to the float and at their upper ends to the piston rod, an inlet valve for the cylinder, a discharge pipe connected to the top of the cylinder, an elongated suction pipe connected to the bottom of the cylinder, a cap secured with the cylinder and adapted to engage over a support for retaining the lower portion of the cylinder in position, and brace members each secured at one end to the cylinder and having their other ends anchored.

2. A wave power pumping apparatus comprising an elongated pump, a float adapted to be sustained by the pump and connected to the piston thereof for operating it when the motion of the waves is imparted to the float, a bell-shaped sustaining device for anchoring the lower end of said pump, and a looped collar at the top of the pump and adapted to be secured to a suitable support.

3. A wave power pumping apparatus comprising an elongated cylinder, a valved piston operating therein and having the valve thereof closed when the piston moves upwardly, a piston rod connected with the piston and projecting from the upper end of the cylinder, said piston rod of a diameter equal to one-half the fluid capacity of the cylinder, whereby when the piston rod descends in the cylinder it is adapted to exclude one-half of its contents and as the piston rod ascends and carries the closed piston valve the remaining half of the contents of the cylinder is excluded, a float surrounding the cylinder, means for coupling the float to the piston rod, a discharge pipe connected to the top of the cylinder, means for retaining the lower portion of the cylinder in an upright position, and means connected with the upper end of the cylinder for bracing it.

4. A wave power pumping apparatus comprising a cylinder, a valved piston operating therein, a piston rod connected to the piston and projecting from the upper end of the cylinder, a float surrounding the cylinder, means for connecting the float to the piston rod, a discharge pipe communicating with the cylinder, a suction pipe communicating with the cylinder, means for anchoring the lower end of the cylinder, and means for bracing the upper end of the cylinder.

In testimony whereof I have hereunto set my hand in presence of two subscribing witnesses.

FRANCIS E. BOSWORTH.

Witnesses:
JOHN KAIN,
ED J. TUBBS.